United States Patent
Wnek et al.

(10) Patent No.: US 8,395,101 B2
(45) Date of Patent: Mar. 12, 2013

(54) CONSTRUCT WITH LOCATING FEATURE

(75) Inventors: Patrick H. Wnek, Sherwood, WI (US);
Terrence P. Lafferty, Neenah, WI (US)

(73) Assignee: Graphic Packaging International, Inc., Marietta, GA (US)

( * ) Notice: Subject to any disclaimer, the term of this patent is extended or adjusted under 35 U.S.C. 154(b) by 382 days.

(21) Appl. No.: 12/771,099

(22) Filed: Apr. 30, 2010

(65) Prior Publication Data
US 2010/0278990 A1   Nov. 4, 2010

Related U.S. Application Data

(60) Provisional application No. 61/215,067, filed on May 1, 2009.

(51) Int. Cl.
*H05B 6/80* (2006.01)
*B65D 1/34* (2006.01)

(52) U.S. Cl. ........ 219/730; 219/728; 219/734; 219/735; 206/557; 426/107; 426/109

(58) Field of Classification Search .................. 219/728, 219/730, 734, 735; 206/557; 426/107, 109
See application file for complete search history.

(56) References Cited

U.S. PATENT DOCUMENTS

| | | | |
|---|---|---|---|
| 2,859,122 A | 11/1958 | Maturi et al. | |
| 3,965,323 A | 6/1976 | Forker, Jr. et al. | |
| 4,175,483 A | 11/1979 | Clark | |
| 4,606,496 A | 8/1986 | Marx et al. | |
| 4,609,140 A | 9/1986 | Van Handel et al. | |
| 4,721,499 A | 1/1988 | Marx et al. | |
| 4,721,500 A | 1/1988 | Van Handel et al. | |
| 4,775,771 A | 10/1988 | Pawlowski | |
| 4,777,053 A | 10/1988 | Tobelmann et al. | |
| 4,794,005 A | 12/1988 | Swiontek | |
| 4,831,224 A | 5/1989 | Keefer | |
| 4,832,676 A | 5/1989 | Johns et al. | |
| 4,862,791 A | 9/1989 | Baughey | |
| 4,865,921 A | 9/1989 | Hollenberg | |
| 4,870,233 A | 9/1989 | McDonald et al. | |
| 4,888,459 A | 12/1989 | Keefer | |
| 4,890,439 A | 1/1990 | Smart | |
| 4,916,280 A | 4/1990 | Havette | |

(Continued)

FOREIGN PATENT DOCUMENTS

| | | |
|---|---|---|
| AU | 635667 | 3/1993 |
| DE | 79 03 283 | 5/1979 |

(Continued)

OTHER PUBLICATIONS

International Search Report and Written Opinion mailed Jan. 28, 2011, for PCT/US2010/033118.

(Continued)

*Primary Examiner* — Dao H Nguyen
(74) *Attorney, Agent, or Firm* — Womble Carlyle Sandridge & Rice, LLP (57) ABSTRACT

A construct for heating a food product. The construct comprises a first centerline extending in a first direction and a second centerline extending in a second direction, wherein the first centerline is substantially perpendicular to the second centerline, a base, a pair of opposed platforms extending upwardly from the base. The pair of opposed platforms are separated by a recess extending in the second direction. The construct comprises at least one locating feature foldably connected to the construct and being located between the opposed platforms for locating a food product on one of the opposed platforms.

31 Claims, 7 Drawing Sheets

U.S. PATENT DOCUMENTS

| | | | |
|---|---|---|---|
| 4,936,935 | A | 6/1990 | Beckett |
| 4,963,424 | A | 10/1990 | Beckett |
| 5,026,958 | A | 6/1991 | Palacios |
| 5,093,364 | A | 3/1992 | Richards |
| 5,117,078 | A | 5/1992 | Beckett |
| 5,213,902 | A | 5/1993 | Beckett |
| 5,217,768 | A | 6/1993 | Walters et al. |
| 5,221,419 | A | 6/1993 | Beckett |
| 5,260,537 | A | 11/1993 | Beckett |
| 5,266,386 | A | 11/1993 | Beckett |
| 5,298,708 | A | 3/1994 | Babu et al. |
| 5,310,977 | A | 5/1994 | Stenkamp et al. |
| 5,310,980 | A | 5/1994 | Beckett |
| 5,317,118 | A | 5/1994 | Brandberg et al. |
| RE34,683 | E | 8/1994 | Maynard |
| 5,340,436 | A | 8/1994 | Beckett |
| 5,350,904 | A | 9/1994 | Kemske et al. |
| 5,354,973 | A | 10/1994 | Beckett |
| 5,410,135 | A | 4/1995 | Pollart |
| 5,424,517 | A | 6/1995 | Habeger |
| 5,519,195 | A | 5/1996 | Keefer |
| 5,565,228 | A | 10/1996 | Gics |
| 5,585,027 | A | 12/1996 | Young |
| 5,628,921 | A | 5/1997 | Beckett |
| 5,672,407 | A | 9/1997 | Beckett |
| 5,698,127 | A | 12/1997 | Lai |
| 5,759,422 | A | 6/1998 | Schmelzer |
| 5,800,724 | A | 9/1998 | Habeger |
| 6,114,679 | A | 9/2000 | Lai |
| 6,150,646 | A | 11/2000 | Lai et al. |
| 6,204,492 | B1 | 3/2001 | Zeng |
| 6,251,451 | B1 | 6/2001 | Zeng |
| 6,414,290 | B1 | 7/2002 | Cole |
| 6,415,944 | B1 * | 7/2002 | Toussant .................. 220/574 |
| 6,433,322 | B2 | 8/2002 | Zeng |
| 6,455,827 | B2 | 9/2002 | Zeng |
| 6,501,059 | B1 | 12/2002 | Mast |
| 6,552,315 | B2 | 4/2003 | Zeng |
| 6,608,292 | B1 | 8/2003 | Barnes |
| 6,639,199 | B1 | 10/2003 | Ross, Jr. |
| 6,651,874 | B1 | 11/2003 | Pedersen |
| 6,677,563 | B2 | 1/2004 | Lai |
| 6,717,121 | B2 | 4/2004 | Zeng |
| 6,765,182 | B2 | 7/2004 | Cole |
| 6,919,547 | B2 | 7/2005 | Tsontzidis |
| 6,988,654 | B2 | 1/2006 | Wnek |
| 7,019,271 | B2 | 3/2006 | Wnek et al. |
| 7,205,517 | B2 | 4/2007 | Hoh |
| 7,323,669 | B2 | 1/2008 | Robison et al. |
| 7,351,942 | B2 | 4/2008 | Wnek et al. |
| 7,365,292 | B2 | 4/2008 | Cole et al. |
| 7,476,830 | B2 | 1/2009 | Middleton et al. |
| 7,541,562 | B2 | 6/2009 | Cole et al. |
| 2001/0000732 | A1 | 5/2001 | Hopkins, Sr. |
| 2001/0021405 | A1 | 9/2001 | Zeng |
| 2003/0085224 | A1 | 5/2003 | Tsontzidis et al. |
| 2006/0011620 | A1 | 1/2006 | Tsontzidis |
| 2007/0029316 | A1 | 2/2007 | Fernandez |
| 2007/0221666 | A1 * | 9/2007 | Keefe et al. .................. 219/728 |
| 2008/0000896 | A1 * | 1/2008 | Lafferty et al. ............... 219/730 |
| 2008/0081095 | A1 | 4/2008 | Cole et al. |
| 2008/0164178 | A1 * | 7/2008 | Wnek et al. .................. 206/557 |
| 2009/0206074 | A1 | 8/2009 | Schneider et al. |
| 2009/0206075 | A1 | 8/2009 | Lafferty |

FOREIGN PATENT DOCUMENTS

| | | |
|---|---|---|
| EP | 0007522 A1 | 2/1980 |
| EP | 0 246 041 | 11/1987 |
| EP | 0 382 399 A2 | 8/1990 |
| GB | 2 407 153 A | 4/2005 |
| JP | 07-033228 U | 6/1995 |
| JP | 15-095332 | 4/2003 |
| JP | 2003-165582 A | 6/2003 |
| JP | 19-312819 | 12/2007 |
| KR | 10-0436263 | 6/2004 |
| KR | 10-0436263 B1 | 6/2004 |
| KR | 10-0813904 B1 | 3/2008 |
| WO | WO 93/23971 A1 | 11/1993 |
| WO | WO 95/24110 A2 | 9/1995 |
| WO | WO 96/22228 A2 | 7/1996 |
| WO | WO 03/041451 A1 | 5/2003 |
| WO | WO 2004/020310 | 3/2004 |
| WO | WO 2005/085091 A2 | 9/2005 |
| WO | WO 2007/133767 A2 | 11/2007 |
| WO | WO 2008/144343 A2 | 11/2008 |
| WO | WO 2009/105397 A2 | 8/2009 |
| WO | WO 2009/105398 A2 | 8/2009 |
| WO | WO 2010/127214 A2 | 11/2010 |

OTHER PUBLICATIONS

Supplementary European Search Report mailed Feb. 22, 2011, for EP 08 75 5465.

International Search Report—PCT/US2008/063615, Dec. 5, 2008, Graphic Packaging International Inc.

Written Opinion—PCT/US2008/063615, Dec. 5, 2008, Graphic Packaging International Inc.

International Search Report—PCT/US2009/034190, Sep. 21, 2009, Graphic Packaging International Inc.

Written Opinion—PCT/US2009/034190, Sep. 21, 2009, Graphic Packaging International Inc.

International Search Report—PCT/US2009/034191, Sep. 21, 2009, Graphic Packaging International Inc.

Written Opinion—PCT/US2009/034191, Sep. 21, 2009, Graphic Packaging International Inc.

International Search Report and Written Opinion—PCT/US2007/011615 mailed May 11, 2007—Graphic Packaging International, Inc. (applicant).

* cited by examiner

CONSTRUCT WITH LOCATING FEATURE

CROSS-REFERENCE TO RELATED APPLICATION

This application claims the benefit of U.S. Provisional Patent Application No. 61/215,067, filed May 1, 2009.

INCORPORATION BY REFERENCE

U.S. Provisional Patent Application No. 61/215,067, which was filed on May 1, 2009, is hereby incorporated by reference for all purposes as if presented herein in its entirety.

U.S. patent application Ser. No. 11/803,466, filed May 15, 2007, is hereby incorporated by reference for all purposes as if presented herein in its entirety.

BACKGROUND OF THE DISCLOSURE

The present disclosure relates to the field of food preparation, and in particular, relates to materials and constructs that may be used to prepare foods in a food cooking apparatus such as a microwave oven.

SUMMARY OF THE DISCLOSURE

In accordance with one aspect, the present disclosure is directed generally to various blanks for forming a tray, package, system, or other construct (collectively "constructs"), various constructs formed therefrom, various methods of making such constructs, and various methods of heating, browning, and/or crisping a food product having a contoured or irregular surface.

In one aspect, the disclosure is generally directed to a construct for heating, browning, and/or crisping a food product. The construct comprises a first centerline extending in a first direction and a second centerline extending in a second direction, wherein the first centerline is substantially perpendicular to the second centerline, a base, a pair of opposed platforms extending upwardly from the base. The pair of opposed platforms are separated by a recess extending in the second direction. The construct comprises at least one locating feature foldably connected to the construct and being located between the opposed platforms for locating a food product on one of the opposed platforms.

In another aspect, the disclosure is generally directed to a method of preparing a food product. The method comprises obtaining a construct comprising a first centerline extending in a first direction and a second centerline extending in a second direction, the first centerline is substantially perpendicular to the second centerline, a base, a first platform, and a second platform. Each of the first platform and the second platform extends upwardly from the base, the first platform and the second platform being separated by a recess extending in the second direction, and at least one locating feature foldably connected to the construct. The method comprises activating the at least one locating feature by upward folding the locating feature so that at least a portion of the locating feature extends above the surface of at least one of the first platform and the second platform, placing a first food product on the at least one of the first platform and the second platform, and heating the food product.

In accordance with one aspect, the present disclosure is directed generally to various blanks for forming a tray, package, system, or other construct (collectively "constructs"), various constructs formed therefrom, various methods of making such constructs, and various methods of heating, browning, and/or crisping a food item or product having a contoured or irregular surface.

The various constructs may include one or more features that enhance heating, browning, and/or crisping of a food item. The various constructs also may include one or more features that accommodate the contours of a food item having an irregular surface, for example, a domed or bowed surface. For example, the various constructs may include one or more elevated or raised portions that bring the heating features into closer proximity to the surface of the food item. In some instances, such raised portions may be shaped, sized, and/or configured to create the visual appearance of grill marks. Furthermore, the various constructs may include one or more features that allow moisture generated during the heating process to be vented away from the food item, thereby further enhancing browning and/or crisping. For example, in some examples, the construct may include one or more venting channels extending across at least a portion of the elevated portions.

Further, the construct may include one or more depressed portions (as viewed from one side of the construct) corresponding to the elevated portion in the other side of the construct. Where such depressed portions are in the bottom of a construct that, in use, lie adjacent the bottom of a surface, such depressions may provide an insulating air gap that reduces heat loss and further enhances heating, browning, and/or crisping of the food item.

The various constructs can include a food locating feature for locating a food product on the heating surface. In one aspect, the food locating feature can comprises a flap that is upwardly struck from the heating surface to align the food product in the correct heating or cooking position.

Additional aspects, features, and advantages of the present disclosure will become apparent from the following description and accompanying figures.

BRIEF DESCRIPTION OF THE DRAWINGS

Corresponding parts are designated by corresponding reference numbers throughout the drawings.

DETAILED DESCRIPTION OF THE EXEMPLARY EMBODIMENTS

The present disclosure relates generally to various aspects of constructs, materials, and packages for cooking or heating food items or products, and methods of making such constructs, materials and packages. Although several different aspects, implementations, and embodiments of the various concepts of the disclosure are provided, numerous interrelationships between, combinations thereof, and modifications of the various disclosures, aspects, implementations, and embodiments of the disclosures are contemplated hereby.

Figure 1:
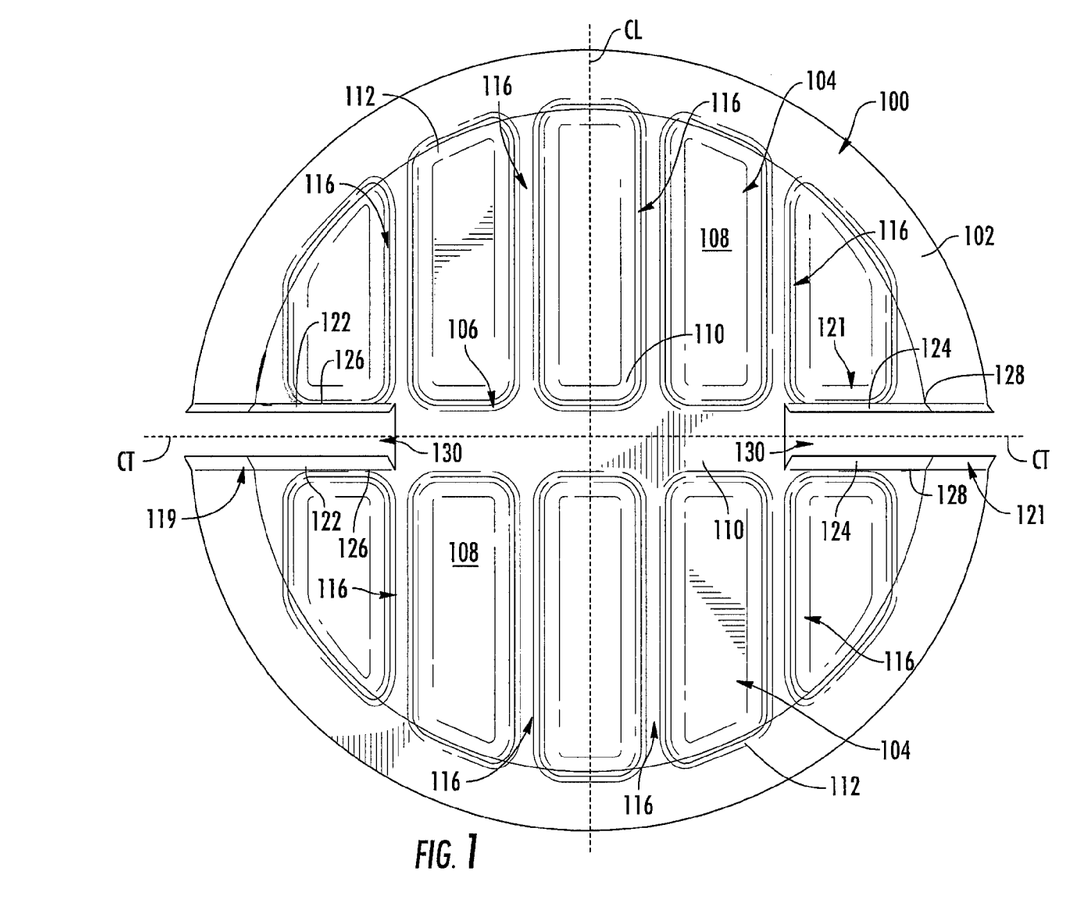
FIG. 1 is a plan view of a construct according to a first embodiment of the present disclosure.

FIG. 1 is a plan view of an exemplary construct, in this example, a disk or tray 100, according to various aspects of the disclosure. The construct 100 is substantially circular in shape, and is substantially symmetrical along a longitudinal centerline CL and a transverse centerline CT. However, numerous other shapes and configurations are contemplated hereby. For example, the tray may have a triangular, rectangular, square, hexagonal, or any other regular and irregular shape. Likewise, the tray may include no lines of symmetry, a single line of symmetry, or multiple lines of symmetry.

The tray 100 includes a somewhat planar peripheral rim or base 102, and a pair of opposed raised portions or platforms 104 that serve as surfaces for receiving one or more food products (not shown) thereon. The raised portions 104 are separated by a recess 106 that lies substantially within the same plane as the rim 102. In this example, the recess 106 lies along the transverse centerline CT. However, the recess 106 may have any other suitable shape or position, as needed or desired for a particular application.

Each platform 104 is substantially semi-circular in shape, suitable for receiving, for example, a half Panini or other sandwich thereon. Each platform 104 includes a top surface or face 108 (also referred to as "uppermost surface" and "heating surface"), a somewhat upstanding interior face 110, a somewhat upstanding exterior face 112. It will be understood that, in this and other aspects of the disclosure, the various faces 108, 110, and 112 are described as being individual faces or surfaces merely for purposes of simplicity and ease of description, and that such faces or surfaces may be substantially continuous and without having a defined boundary between them. Furthermore, it will be understood that the construct 100 may have any desired shape, and that numerous other regular and irregular shapes are contemplated hereby.

The construct 100 can have a similar shape and dimension as the trays and constructs disclosed in U.S. patent application Ser. No. 11/803,466 (the '466 application) that is incorporated by reference herein for all purposes. Also, the construct 100 could have other shapes and dimension without departing form the scope of this disclosure.

In the illustrated embodiments, the construct 100 includes four substantially parallel channels 116 or indentations extending across the top face 108 of each platform 104, and optionally through one or both of, the interior face 110 and the exterior face 112. The channels 116 may be desirable to facilitate venting and to attain the desired degree of browning and/or crisping of a food product prepared thereon. The channels 116 may have any suitable depth as needed to provide the desired degree of ventilation for the particular heating application.

Figure 3:
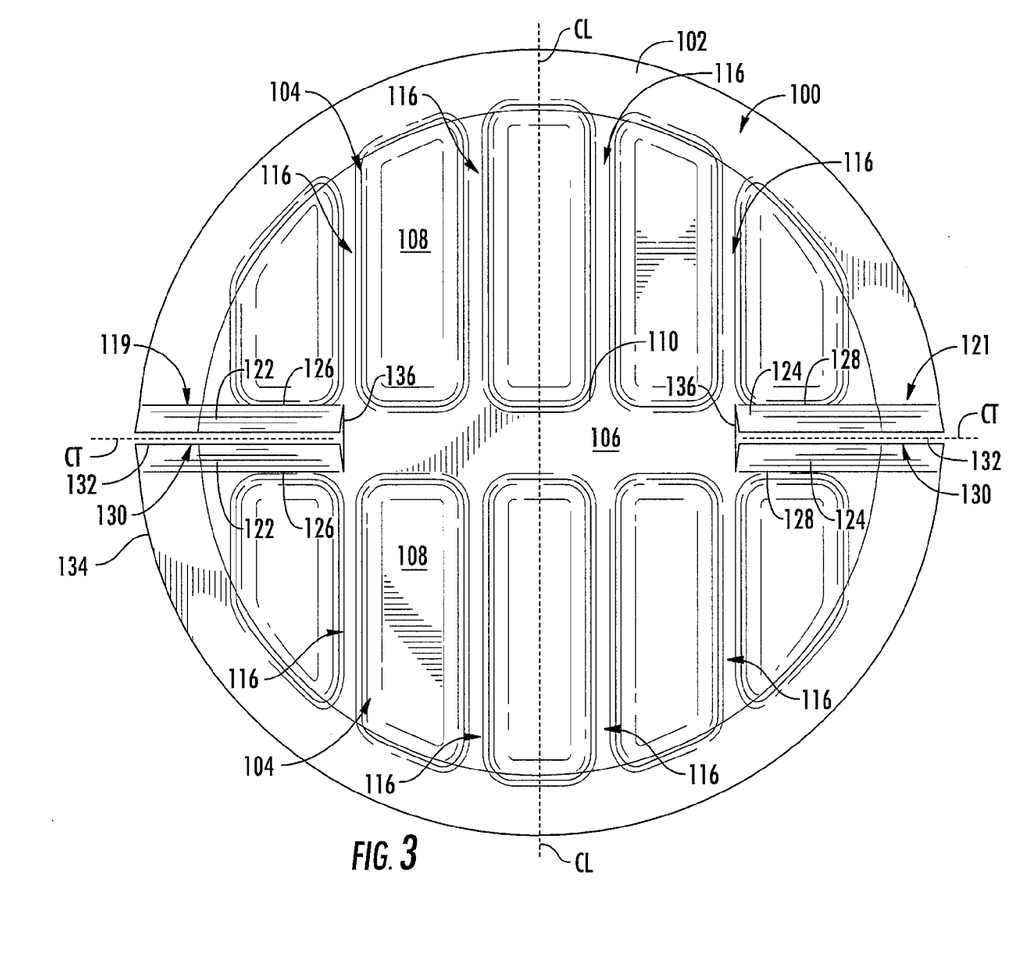
FIG. 3 is a plan view of a construct according to a second embodiment of the present disclosure.

In the embodiment of FIG. 1, the construct includes two locating features 119, 121 for locating a food product on a respective platform 104. In one embodiment, each of the locating features 119, 121 comprises a respective flap 122, 124 that is respectively foldably connected to the construct 100 at a fold line 126, 128. The fold lines 126, 128 extend generally in the transverse direction, parallel to the transverse centerline CT and are located in the recess 106. Alternatively, the fold lines 126, 128 could be located on a respective platform 104 without departing from the scope of the disclosure. As shown in FIG. 3, the adjacent flaps 122, 124, are shaped by a T-shaped cut 130 in the recess 106. Each of the T-shaped cuts 130 have a first transverse portion 132 that extends from a peripheral edge 134 of the construct 100 at a point located on the transverse centerline CT, to a second longitudinal portion 136 extending between the fold lines 126, 128. In one embodiment, the first portion 132 and the second portion 136 are both located in the recess, but one or both of the portions could be located on one or both of the platforms 104 without departing from the disclosure. In the illustrated embodiment, the flaps 122, 124 are generally rectangular shaped, but the flaps can be otherwise shaped, arranged, and/or configured, and could be formed by lines of weakening other than the T-shaped cuts 130 (e.g., a tear line, etc.).

If desired, any of the various constructs or trays of the disclosure may include features that alter the effect of microwave energy during the heating or cooking of the food item. For example, any of the trays may be formed at least partially from one or more microwave energy interactive elements (sometimes referred to as "microwave interactive elements") that promote browning and/or crisping of a particular area of the food item, shield a particular area of the food item from microwave energy to prevent overcooking thereof, or transmit microwave energy towards or away from a particular area of the food item. Each microwave interactive element comprises one or more microwave energy interactive materials or segments arranged in a particular configuration to absorb microwave energy, transmit microwave energy, reflect microwave energy, or direct microwave energy, as needed or desired for a particular microwave heating construct and food item.

The microwave interactive element may be supported on a microwave inactive or transparent substrate for ease of handling and/or to prevent contact between the microwave interactive material and the food item, as will be discussed in greater detail below. As a matter of convenience and not limitation, and although it is understood that a microwave interactive element supported on a microwave transparent substrate includes both microwave interactive and microwave inactive elements or components, such structures may be referred to herein as "microwave interactive webs".

In one example, the microwave interactive element may comprise a thin layer of microwave interactive material that tends to absorb microwave energy, thereby generating heat at the interface with a food item. Such elements often are used to promote browning and/or crisping of the surface of a food item. When supported on a film or other substrate, such an element may be referred to collectively with the substrate as a "susceptor film" or sometimes, simply, "susceptor".

For example, a microwave energy interactive element, for example, a susceptor, may overlie all or a portion of each platform 104, including all or a portion of the top surface 108, recess 106, interior face 110, or other areas. A susceptor or other microwave energy interactive element also may overlie all or a portion of exterior face 112, or other surface areas, all or a portion of recess 106, and/or all or a portion of one or more of channels 116. The resulting pattern of browning and/or crisping may include an overall darkened appearance with somewhat lighter areas corresponding to the areas overlying channels 116, generally resembling grill marks.

Where the susceptor is supported on a polymer film, it will be understood that the polymer film substrate may overlie additional portions or substantially the entire tray, with the microwave energy interactive element (i.e., the susceptor) positioned between the substrate and the particular tray component in the desired location to heat, brown, and/or crisp the food item. In this manner, a tray according to the disclosure can be pressed or otherwise formed from a multilayer structure comprising the susceptor film joined to the material used to form the tray.

To use the construct 100, one or more food products or items (not shown) typically are placed on each platform 104 and the construct and food item(s) are placed into a microwave oven (not shown). In one particular example, the food product is a sandwich that has been separated into two sections, each including a piece of bread and one or more toppings in an "open face" configuration. In other embodiments, the food product is a pizza, which has been separated into, or provided as, two separate pieces, slices, or portions. In yet another example, the food product is a single product, for example, a pizza, that has not been divided into separate pieces, slices, or portions. In such an example, the pizza may overlie both platforms 104 and the recess 106 therebetween. Alternatively still, it is contemplated that the tray may include a plurality of platforms, each intended to receive one or more of a plurality of products, or one or more portions of a plurality of products, to be heated.

Figure 2:
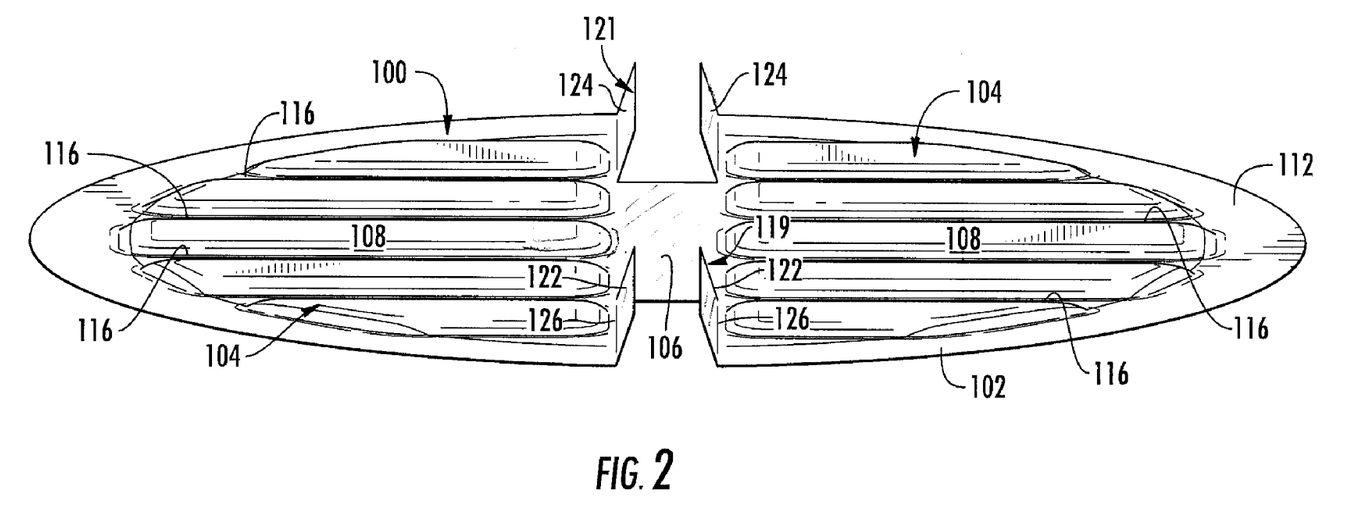
FIG. 2 is a side perspective view of the construct of FIG. 1.

Prior to positioning a first food product and a second food product on a respective heating surface 108 of each platform 104, each locating feature 119 can be activated. Each locating feature 119, 121 is activated by upwardly folding the flaps 122, 124 from the position of FIG. 3 to the position of FIGS. 1 and 2. The upwardly folded flaps 122, 124 extend above the surface 108 of the platforms 104 to provide a divider or barrier between the two platforms so that the food product is properly aligned on each heating surface. The edge of the food product on a respective one of the platforms 104 would contact one flap 122 of the first locating feature 119 and another flap 124 of the second locating feature 121, so the food product is prevented from being misaligned on the heating surface 108. In any case, the food products are positioned on the heating surface 108 of each platform 104 with the surface to be browned and/or crisped, for example, the bread or pizza crust, in contact and supported by the heating surface of the construct 100. The contoured heating surface 108 of the platform 104 generally accommodates the contoured surface of the food product, which often is prone to bowing during the freezing process, and brings the susceptor into closer proximity to the surface of the food product to be browned and/or crisped.

It is noted that, with any of the numerous trays or constructs contemplated hereby, the food product or items may be slightly larger than the respective platform, in this example, platform 104, and therefore, the food may extend slightly beyond the "boundaries" of the heating surface, in this example, top face 108. As the food product thaws, any such portion of the food product extending beyond the heating surface may flex downwardly and be brought into proximate and/or intimate contact with the various upstanding faces of the platform, for example, faces 110, 112, and/or 114. Where a microwave energy interactive element, for example, a susceptor, overlies such faces, the faces may serve as heating surfaces to enhance browning and/or crisping of the corresponding portions of the food product.

The food product or products supported by the construct 100 are heated by placing the construct and food products in a microwave oven. As the microwave heating cycle progresses, the susceptor converts microwave energy to thermal energy, which then is transferred to the adjacent surface of the food product. In this manner, the browning and/or crisping of the surface of the food product can be enhanced. Furthermore, platforms 104 maintain the food product in a position elevated from the floor or turntable of the microwave oven, which reduces the amount of sensible heat transferred from the susceptor to the ambient environment of the microwave oven and further enhances browning and/or crisping.

Any of the numerous microwave interactive elements described herein or contemplated hereby may be substantially continuous, that is, without substantial breaks or interruptions, or may be discontinuous, for example, by including one or more breaks or apertures that transmit microwave energy therethrough. The breaks or apertures may be sized and positioned to heat particular areas of the food product selectively. The number, shape, size, and positioning of such breaks or apertures may vary for a particular application depending on type of tray or other construct being formed, the food product to be heated therein or thereon, the desired degree of shielding, browning, and/or crisping, whether direct exposure to microwave energy is needed or desired to attain uniform heating of the food product, the need for regulating the change in temperature of the food product through direct heating, and whether and to what extent there is a need for venting.

It will be understood that the aperture may be a physical aperture or void in the material used to form the construct, or may be a non-physical "aperture". A non-physical aperture may be a portion of the tray that is microwave energy inactive by deactivation or otherwise, or one that is otherwise transparent to microwave energy. Thus, for example, the aperture may be a portion of the tray formed without a microwave energy active material or, alternatively, may be a portion of the tray formed with a microwave energy active material that has been deactivated. While both physical and non-physical apertures allow the food product to be heated directly by the microwave energy, a physical aperture also provides a venting function to allow steam or other vapors to be released from the food product.

Figure 4:
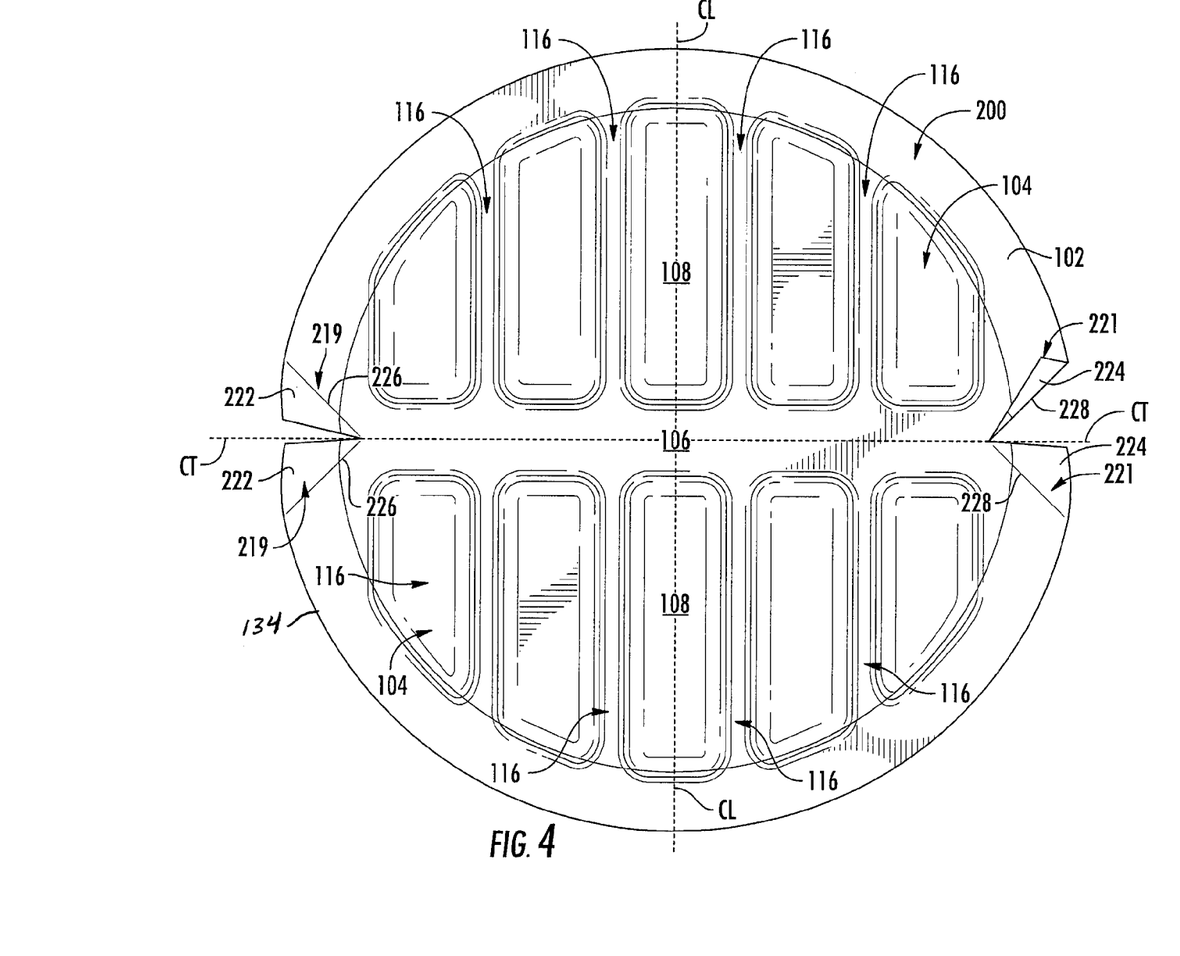
FIG. 4 is a plan view of a construct according to a third embodiment of the present disclosure.

FIG. 4 shows a second embodiment of a construct 200 for heating a food product. The construct 200 is similar to the construct 100 of the first embodiment and like or similar features have been designated with like or similar reference numbers throughout the drawings. In the embodiment of FIG. 4, the construct 200 includes two food locating features 219, 221 on each platform 104. In the second embodiment, the food locating features 219, 221 each comprise a respective locating flap 222, 224 that is generally triangular-shaped. Each locating flap 222, 224 is respectively foldably connected to a platform 104 at a respective oblique fold line 226, 228. In the second embodiment, the adjacent flaps 222, 224 are at least partially defined by a longitudinal cut 230 extending from an edge 134 of the construct 200 to each of the fold lines 226, 228. The locating flaps 222, 224 could be otherwise shaped, arranged, and/or configured without departing from the scope of the disclosure.

The locating flaps 222, 224 function in a similar manner as the locating flaps 122, 124 of the first embodiment, in that the locating flaps help align the food product on the heating surfaces 108 of the platform. The locating flaps 222, 224 prevent the edge of a corresponding food product that is placed on the platform 104 from extending across the recess 106 and onto the adjacent heating surface 108.

Figure 5:
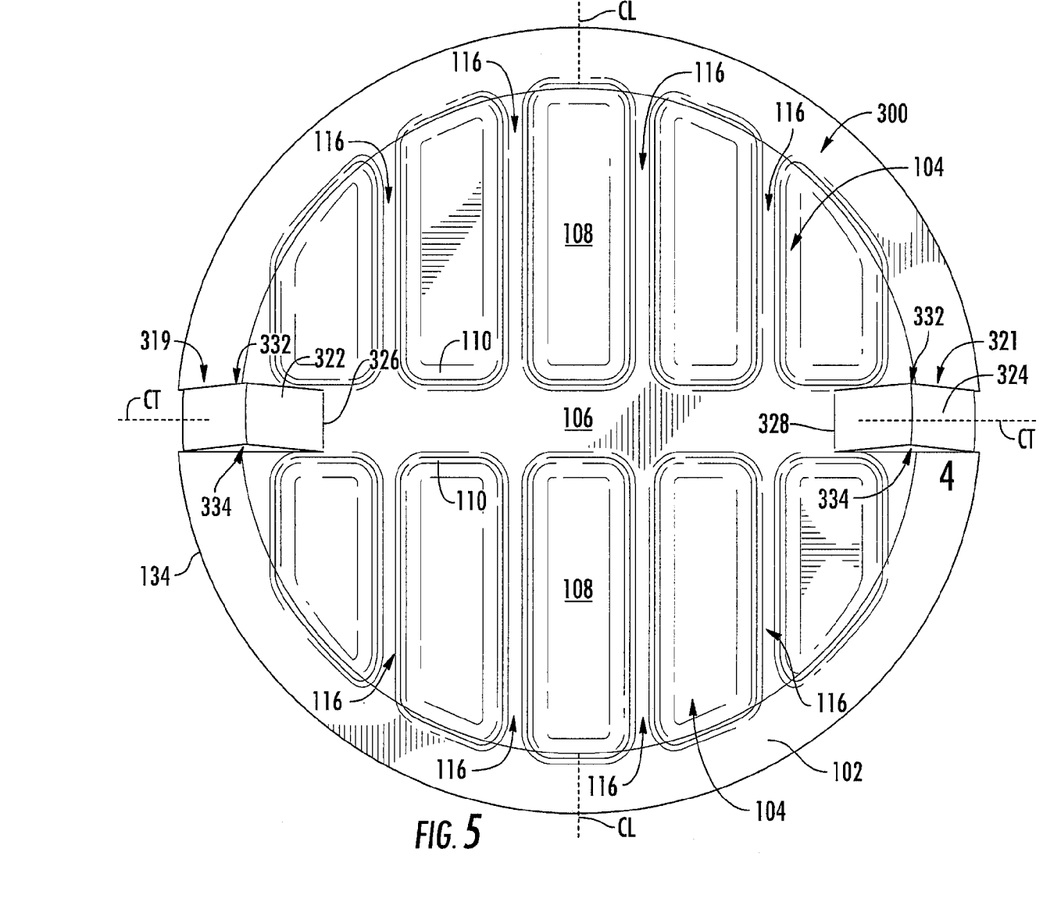
FIG. 5 is a side elevation view of the construct of FIG. 4.
Figure 6:
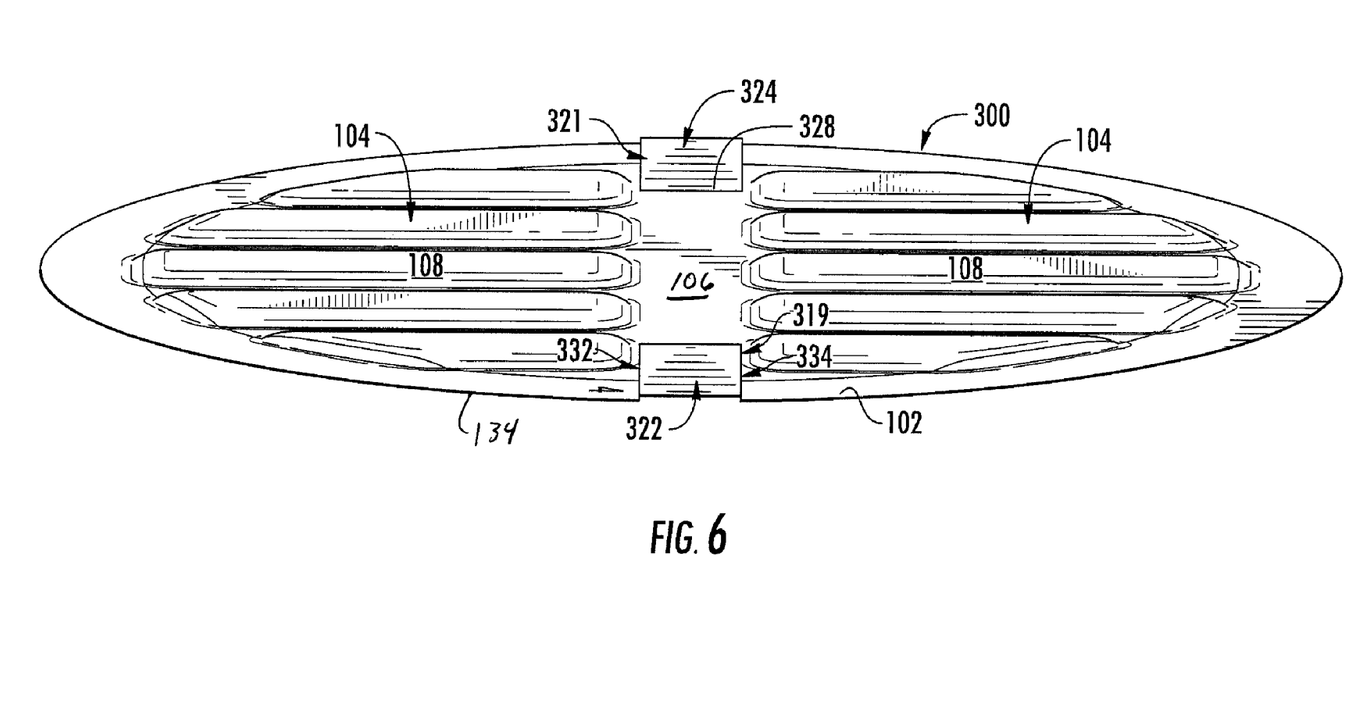
FIG. 6 is a plan view of a construct according to a fourth embodiment of the present disclosure.

FIGS. 5 and 6 illustrate a third embodiment of a construct 300 for heating a food product. The construct 300 is similar to the constructs 100, 200 of the first and second embodiments and like or similar features have been designated with like or similar reference numbers throughout the drawings. In the embodiment of FIGS. 5 and 6, the construct 200 includes two food locating features 319, 321 located in the trough 106. In the third embodiment, each locating feature 319, 321 comprises a respective rectangular shaped flap 322, 324. Each locating flap 322, 324 is foldably connected to the construct 300 at a lateral fold line 326, 328 extending across the trough 106. In the third embodiment, the locating flaps 322, 324 are formed by a pair of spaced apart cuts 332, 334 that extend transversely from an edge 334 of the construct 300. The cuts 332, 334 are spaced apart from and generally parallel to the transverse centerline CT. The locating flaps 322, 324 could be otherwise shaped, arranged, and/or configured without departing from the disclosure.

The locating flaps 322, 324 function in a similar manner as the locating flaps of the previous embodiments, in that the locating flaps are activated to at least partially extend above the surfaces 108 of the platforms 104 (FIG. 6). The locating flaps 322, 324 help align the food product on each of the heating surfaces 108 of the platform. When the locating flaps 322, 324 are upwardly struck from the trough 106, the locating flaps extend above the surface 108 of each of the platform to prevent the edge of a corresponding food product that is placed on a respective platform 104 from extending across the recess 106 and onto the adjacent heating surface 108.

Figure 7:
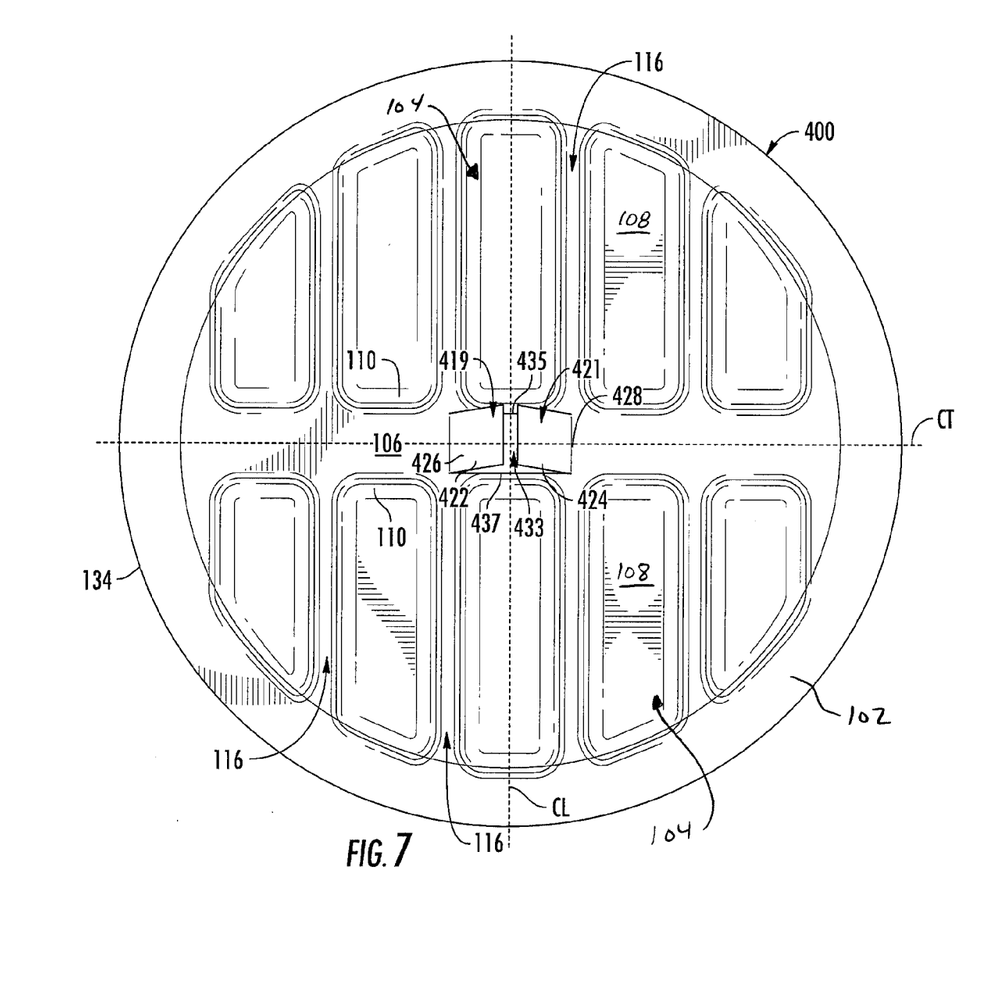
FIG. 7 is a plan view of a construct according to a fourth embodiment of the present disclosure.

FIG. 7 illustrates a fourth embodiment of a construct 400 for heating a food product. The construct 400 is similar to the constructs of the previous embodiments and like or similar features have been designated with like or similar reference numbers throughout the drawings. In the embodiment of FIG. 7, the construct 400 includes two food locating features 419, 421 located in the trough 106. In the fourth embodiment, each locating feature 419, 421 comprises a respective rectangular-shaped flap 422, 424, with each flap being separated and at least partially formed by a lateral cut 433. The locating flaps 422, 424 are further at least partially formed by transversely extending cuts 435, 437 that can be located at respective spaced-apart edges of the trough 106. Each locating flap 422, 424 is foldably connected to the construct 300 at a lateral fold line 426, 428 extending across the trough 106. In the third embodiment, the cuts 433, 435, 437 that form the locating flaps 422, 424 are spaced in from the edge of the construct with the longitudinal cut 433 being located on the longitudinal centerline CL and the lateral cuts 435, 437 being located adjacent to and in spaced-apart parallel, planar relationship with the transverse centerline CT. the locating features 419, 421 are activated by upwardly folding the locating flaps 422, 424 so that the flaps extend upwardly above the surfaces 108 of the platforms 104. The locating features 419, 421 are located in the construct 400 at a location that is adjacent to the middle of the construct (e.g., the intersection of the transverse centerline CT and the longitudinal centerline CL). The locating flaps 422, 424 could be otherwise shaped, arranged, and/or configured without departing from the disclosure.

The locating flaps 422, 424 function in a similar manner as the locating flaps of the previous embodiments, in that the locating flaps help align the food product on the heating surfaces 108 of the platform. When the locating flaps 422, 424 are upwardly struck from the trough 106, the locating flaps prevent the edge of a corresponding food product that is placed on a respective platform 104 from extending across the recess 106 and onto the adjacent heating surface 108.

For convenience, constructs, food items or products, and packages are described herein as having a top, bottom, and sides. In many instances, the top, bottom, and sides of a package or a food item are relative to a surface the food item is placed on and the perspective of the viewer. It should be understood that reference to a top, bottom, or side is not meant to impart any particular limitation on the scope of the disclosure, but merely provide an easy way to refer to describe the features thereof.

In general, the construct may be at least partially constructed from paperboard having a caliper so that it is heavier and more rigid than ordinary paper. The construct can also be constructed of other materials, such as cardboard, or any other material having properties suitable for enabling the construct to function at least generally as described above.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding thereal-ong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A construct for heating, browning, and/or crisping a food product, the construct comprising:
   a first centerline extending in a first direction and a second centerline extending in a second direction, wherein the first centerline is substantially perpendicular to the second centerline;
   a base;
   a pair of opposed platforms extending upwardly from the base, the pair of opposed platforms being separated by a recess extending in the second direction; and
   at least one locating feature foldably connected to the construct and being located between the opposed platforms for locating a food product on one of the opposed platforms, wherein the at least one locating feature comprises at least one flap, and wherein the at least one flap is at least partially defined by at least one cut.

2. The construct of claim 1 wherein the at least one flap is foldably connected to the construct at a fold line at least partially located in the recess.

3. The construct of claim 2 wherein the at least one locating feature comprises a pair of flaps each independently foldably connected to the construct at respective fold lines.

4. The construct of claim 3 wherein the pair of flaps are shaped by a T-shaped cut in the recess.

5. The construct of claim 4 wherein the T-shaped cut has a first portion that extends from a peripheral edge of the construct to a second portion that extends between the respective fold lines.

6. The construct of claim 3 wherein the at least one locating feature is a first locating feature and the pair of flaps is a first pair of flaps, the construct comprises a second locating feature comprising a second pair of flaps, one flap of each of the first pair of flaps and second pair of flaps is for locating a food product on one of the platforms of the pair of platforms, and the other flap of each of the first pair of flaps and second pair of flaps is for locating a food product on the other of the platforms of the pair of platforms.

7. The construct of claim 3 wherein each flap of the pair of flaps is generally rectangular shaped.

8. The construct of claim 3 wherein each flap of the pair of flaps is generally triangular shaped.

9. The construct of claim 8 wherein each flap of the pair of flaps is foldably connected to the construct at a respective oblique fold line that is oblique relative to at least one of the first centerline and the second centerline.

10. The construct of claim 2 wherein the at least one flap is foldably connected to the construct at a lateral fold line in the recess.

11. The construct of claim 10 wherein the at least one flap is formed by a pair of spaced apart cut lines extending from and edge of the construct to the lateral fold line.

12. The construct of claim 10 wherein the at least one flap is formed by a pair of spaced apart cut lines extending between the lateral fold line and a lateral cut.

13. The construct of claim 12 wherein the lateral cut is located on at least one of the first centerline and the second centerline.

14. The construct of claim 2 wherein the at least one locating feature is a first locating feature and the at least one flap is a first flap, the at least one locating feature comprising a second locating feature comprising a second flap.

15. The construct of claim 14 wherein the first flap and the second flap are both for locating a first food product on one of the platforms of the pair of platforms and for locating a second food product on the other of the platforms of the pair of platforms.

16. The construct of claim 1 further comprising a microwave interactive element for heating the food product when the construct is placed in a microwave oven.

17. A method of preparing a food product comprising:
obtaining a construct comprising a first centerline extending in a first direction and a second centerline extending in a second direction, wherein the first centerline is substantially perpendicular to the second centerline, a base, a first platform, and a second platform, each of the first platform and the second platform extending upwardly from the base, the first platform and the second platform being separated by a recess extending in the second direction, and at least one locating feature foldably connected to the construct, wherein the at least one locating feature comprises at least one flap, and wherein the at least one flap is at least partially defined by at least one cut;
activating the at least one locating feature by upward folding the locating feature so that at least a portion of the locating feature extends above the surface of at least one of the first platform and the second platform;
placing a first food product on at least one of the first platform and the second platform; and
heating the food product.

18. The method of claim 17 wherein the at least one flap is foldably connected to the construct at a fold line at least partially located in the recess.

19. The method of claim 18 wherein the at least one locating feature comprises a pair of flaps each independently foldably connected to the construct at respective fold lines.

20. The method of claim 19 wherein the pair of flaps are shaped by a T-shaped cut in the recess, and the T-shaped cut has a first portion that extends from a peripheral edge of the construct to a second portion that extends between the respective fold lines.

21. The method of claim 19 wherein the at least one locating feature is a first locating feature and the pair of flaps is a first pair of flaps, the construct comprises a second locating feature comprising a second pair of flaps, one flap of each of the first pair of flaps and second pair of flaps is for locating a first food product on the first platform, and the other flap of each of the first pair of flaps and second pair of flaps is for locating a second food product on the second platform.

22. The method of claim 19 wherein each flap of the pair of flaps is generally rectangular shaped.

23. The method of claim 19 wherein each flap of the pair of flaps is generally triangular shaped.

24. The method of claim 23 wherein each flap of the pair of flaps is foldably connected to the construct at a respective oblique fold line that is oblique relative to at least one of the first centerline and the second centerline.

25. The method of claim 18 wherein the at least one flap is foldably connected to the construct at a lateral fold line in the recess.

26. The method of claim 25 wherein the at least one flap is formed by a pair of spaced apart cut lines extending from and edge of the construct to the lateral fold line.

27. The method of claim 25 wherein the at least one flap is formed by a pair of spaced apart cut lines extending between the lateral fold line and a lateral cut.

28. The method of claim 27 wherein the lateral cut is located on at least one of the first centerline and the second centerline.

29. The method of claim 18 wherein the at least one locating feature is a first locating feature and the at least one flap is a first flap, the at least one locating feature comprising a second locating feature comprising a second flap.

30. The method of claim 29 wherein the first flap and the second flap are both for locating a first food product on one of the platforms of the pair of platforms and for locating a second food product on the other of the platforms of the pair of platforms.

31. The method of claim 17 wherein the construct further comprises a microwave interactive element, the heating the food product comprises heating the food product in a microwave oven and browning at least a portion of the food product by contact with the microwave interactive element during the heating.

* * * * *